United States Patent [19]

Shah et al.

[11] Patent Number: 6,001,940
[45] Date of Patent: Dec. 14, 1999

[54] PROCESS FOR PREPARING ANHYDRIDE POLYMERS

[75] Inventors: Shailesh Shantilal Shah, Warrington; Barry Weinstein, Dresher, both of Pa.

[73] Assignee: Rohm and Haas Company, Phila., Pa.

[21] Appl. No.: 09/025,086

[22] Filed: Feb. 17, 1998

Related U.S. Application Data

[60] Provisional application No. 60/041,224, Mar. 18, 1997.

[51] Int. Cl.$^6$ ..................................................... C08F 22/04
[52] U.S. Cl. ........................ 526/217; 526/227; 526/236; 526/271
[58] Field of Search .................................... 526/271, 217, 526/227, 236

[56] References Cited

U.S. PATENT DOCUMENTS

| | | |
|---|---|---|
| 3,846,383 | 11/1974 | Uyama et al. . |
| 3,919,258 | 11/1975 | Richardson . |
| 4,370,454 | 1/1983 | Messmer ..................................... 526/88 |
| 4,818,795 | 4/1989 | Denzinger . |
| 5,077,364 | 12/1991 | Rideout . |
| 5,082,910 | 1/1992 | Tazi ........................................ 526/227 |

FOREIGN PATENT DOCUMENTS

| | | |
|---|---|---|
| 1040415 | 8/1966 | United Kingdom . |

OTHER PUBLICATIONS

Joginder Lal and R. Green, Journal of Polymer Science Effect of Amine Accelerators on the Polymerization of Methyl Methacrylate with Benzoyl Peroxide; 1955: 403–409.

*Primary Examiner*—Fred Zitomer
*Attorney, Agent, or Firm*—Thomas J. Howell

[57] ABSTRACT

A process for preparing anhydride polymers in aromatic hydrocarbon solvents using a dialkyl peroxide/amine compound initiator system is disclosed. The amine compound allows more efficient use of free-radical initiators while achieving high monomer conversion polymerizations compared to conventional initiator systems, particularly in the preparation of maleic anhydride polymers.

16 Claims, No Drawings

PROCESS FOR PREPARING ANHYDRIDE POLYMERS

This is a nonprovisional application of prior provisional application Ser. No. 60/041,224 filed Mar. 18, 1997.

BACKGROUND

This invention relates to an improved process for preparing anhydride polymers, notably poly(maleic anhydride). In particular, this invention relates to the use of amines during polymerization that allow more efficient use of freeradical initiators in achieving high monomer conversion of maleic anhydride.

Low molecular weight hydrolyzed poly(maleic anhydride) polymers and its salts are well-known as dispersants, scale inhibitors, detergent additives and sequestrants; generally a molecular weight below about 2,000 is typical for these applications. Previous processes for preparing poly(maleic anhydride) using aromatic hydrocarbon solvents, such as toluene and xylene, used large quantities of free-radical initiators but the final polymers contained substantial amounts of unpolymerized maleic anhydride. Attempts to improve the efficiency of polymerization include the use of di-tert-butyl peroxide initiator in xylene and temperature dependent isolation of poly(maleic anhydride) as an immiscible phase (U.S. Pat. No. 3,919,258), use of peroxyester initiators (U.S. Pat. No. 4,818,795) and dilute solution polymerization in xylene with limited initiator concentrations (U.S. Pat. No. 5,077,364). However these approaches still do not combine efficient use of readily available initiators with high monomer conversion.

The present invention seeks to overcome the problems associated with prior art processes used to prepare poly (maleic anhydride) by providing an efficient polymerization process using low levels of initiator while providing high monomer conversion.

STATEMENT OF INVENTION

According to a first aspect of the present invention there is provided a polymerization process for preparing anhydride polymers, comprising polymerizing monomer selected from one or more of maleic anhydride, citraconic anhydride, itaconic anhydride, 1,2,3,6-tetrahydrophthalic anhydride, 5-norbornene-2, 3-dicarboxylic anhydride, bicyclo[2.2.2]-5-octene-2, 3-dicarboxylic anhydride, 3-methyl-1,2,6-tetrahydrophthalic anhydride and 2-methyl-1,3,6-tetrahydrophthalic anhydride, in the presence of (a) an aromatic hydrocarbon, (b) 3 to 30 percent by weight, based on weight of monomer, of dialkyl peroxide, and (c) 0.01 to 3 percent by weight, based on weight of monomer, of an amine compound; until greater than 90 percent by weight of the anhydride monomer has been converted to polymer.

In another aspect, the present invention provides a process as described above wherein the amine compound is selected from one or more of dibutylamine, ethylhexylamine, methydibutylamine, ethylenediamine, diethylenetriamine, n-octylamine, 1,1,3,3-tetramethylbutylamine and dimethylaniline.

DETAILED DESCRIPTION

In the process of the present invention, anhydrides are polymerized in an aromatic hydrocarbon or in a mixture of the hydrocarbons. Suitable aromatic hydrocarbons include, for example, benzene and toluene; ($C_8$)aromatic hydrocarbons such as ethylbenzene and xylenes (ortho, meta and para isomers); ($C_9$)aromatic hydrocarbons such as propylbenzene, isopropylbenzene (also known as cumene), ethyltoluenes (ortho, meta and para isomers), trimethylbenzenes (1,2,4-trimethylbenzene or pseudocumene, 1,3,5-trimethylbenzene or mesitylene) and indan; ($C_{10}$)aromatic hydrocarbons such as diethylbenzenes (ortho, meta and para isomers), isopropyltoluenes (ortho, meta and para isomers, also known as cymene), butylbenzenes (n-butyl, sec-butyl, iso-butyl and tert-butyl), tetralin, ethyldimethylbenzenes, naphthalene, isodurene and durene; ($C_{11}$–$C_{14}$)aromatic hydrocarbons such as methylnaphthalenes, dimethylnaphthalenes, ethylnaphthalenes, dimethylindan, biphenyl and diisopropylbenzene (ortho, meta and para isomers). Preferred aromatic hydrocarbons are toluene, ethylbenzene, ortho-xylene, meta-xylene, para-xylene and mixtures thereof.

Optionally, other solvents may be used in combination with the aromatic hydrocarbon solvents, for example, halogenated aromatic hydrocarbons such as chlorobenzene; ($C_8$–$C_{12}$)nonaromatic hydrocarbons (branched and linear); capped glycol ethers such as ($C_1$–$C_4$)alkyl diethers of diethylene glycol; 1-methyl-2-pyrrolidinone. The amount of optional solvent used is preferably less than 50%, more preferably less than 20% and most preferably less than 10%, based on weight of the total solvent used. The optional solvents may be used as long they do not significantly affect the anhydride polymerization or the solubility of the anhydride monomer in the polymerization medium.

The anhydrides that may be polymerized by the process of the present invention include, for example, maleic anhydride, citraconic anhydride, itaconic anhydride, 1,2,3,6-tetrahydrophthalic anhydride, 5-norbornene-2,3-dicarboxylic anhydride, bicyclo[2.2.2]-5-octene-2,3-dicarboxylic anhydride, 3-methyl-1,2,6-tetrahydrophthalic anhydride, 3,6-epoxy-1,2,3,6-tetrahydrophthalic anhydride, 2-methyl-1,3,6-tetrahydrophthalic anhydride and mixtures thereof Preferably, the anhydride monomer is comprised of at least 50 percent (%), more preferably at least 75% and most preferably at least 90%, maleic anhydride, by weight based on total weight of monomer.

Optionally, other monomers may be polymerized in combination with the anhydride monomers, for example acrylic acid, methacrylic acid, vinyl acetate, styrene, ($C_1$–$C_4$)alkyl (meth)acrylate esters, alkyl substituted (meth)acrylamides and vinyl ethers. The amount of optional monomer used is preferably less than 20%, more preferably less than 10% and most preferably less than 5%, based on total weight of monomer. The optional monomers may be used as long they do not significantly affect the anhydride polymerization or the solubility of the anhydride monomer in the polymerization medium.

Suitable dialkyl peroxide free-radical initiators useful in the process of the present invention include, for example, di-tert-butyl peroxide, di-tert-amyl peroxide, n-butyl-4,4-di (tert-butylperoxy)pivalate, tert-butyl cumyl peroxide and dicumyl peroxide. The preferred free-radical initiator is di-tert-butyl peroxide. The amount of free-radical initiator used in the process of the present invention is from 3 to 30%, preferably from 5 to 25% and more preferably from 10 to 20%, by weight based on weight of anhydride monomer. As used herein, the term "dialkyl peroxide" refers to an initiator containing the dialkyl peroxide linkage, $R_1$—O—O—$R_2$, where $R_1$ and $R_2$ may be the same or different and are substituted alkylene or alkyl groups; the $R_1$ and $R_2$ groups may contain aromatic or other functionalities (such as ester linkages) as long they do not adversely affect the performance of the dialkyl peroxide as a free-radical initiator.

In the process of the present invention, we have found that amine compounds used in conjunction with the free-radical initiator increase the efficiency of the anhydride polymerization by allowing lower temperatures and lower levels of free-radical initiator to be used compared to conventional temperatures and initiator levels used to provide high anhydride monomer conversions, that is, greater than about 90%, preferably greater than 95% and most preferably greater than 99% monomer conversion. The use of amine compounds to improve the efficacy of anhydride free-radical polymerization is surprising given the teachings in the prior art regarding the detrimental effect of amine compounds on free-radical polymerizations in general. For example, the polymerization of methyl methacrylate with benzoyl peroxide was shown to be accelerated by dimethylaniline and other tertiary aromatic amines, but the polymerization was not accelerated by aliphatic primary, secondary and tertiary amines or primary and secondary aromatic amines (J. Lal and R. Green in *J. Polymer Science*, Vol XVII, pp 403–409 (1955)); similar effects regarding the polymerization of styrene with benzoyl peroxide were also disclosed. In contrast to that teaching, we have found that primary, secondary and tertiary aliphatic amines enhance the rate of polymerization of anhydride monomers using dialkyl peroxides; we have further observed that this effect is absent when diacyl peroxide initiator is used in the polymerization of anhydride monomers (see Examples 27 and 28).

Suitable amine compounds include, for example, ammonia, ($C_1$–$C_{22}$)aliphatic amines and ($C_6$–$C_{20}$)aromatic amines. Suitable aliphatic amines include, for example, primary, secondary and tertiary alkylamines (branched or linear) such as methylamine, dimethylamine, trimethylamine, butylamine, dibutylamine, ethylhexylamine, methydibutylamine, n-octylamine, 1,1,3,3-tetramethylbutylamine (also known as tert-octyl amine), ($C_{12}$–$C_{14}$)tert-alkyl primary amine mixture, ($C_6$–$C_{22}$)tert-alkyl primary amine mixture; and polyamines such as ethylenediamine, diethylenetriamine, triethylenetetramine and 1,8-diamino-p-menthane. Suitable aromatic amines include, for example, aniline and dimethylaniline. Preferred amine compounds are ammonia, dibutylamine, ethylhexylamine, methydibutylamine, ethylenediamine, diethylenetriamine, n-octylamine, 1,1,3,3-tetramethylbutylamine and dimethylaniline; more preferably, the amine compound is n-octylamine. The amount of amine compound used in the process of the present invention is from 0.01 to 3%, preferably from 0.05 to 2% and more preferably from 0.1 to 1%, by weight based on weight of anhydride monomer. In addition, preferred weight ratios of amine to free-radical initiator range from 0.001/1 to 0.5/1, more preferably from 0.005/1 to 0.2/1 and most preferably from 0.01/1 to 0.1/1.

The poly(anhydrides) are prepared by dissolving the anhydride monomer in the aromatic hydrocarbon and then polymerizing by adding one or more freeradical initiators and amine compounds. The concentration of the anhydride in the solution of aromatic hydrocarbon is typically from 25 to 70%, preferably from 30 to 60% and more preferably from 35 to 55%, by weight based on total weight of the reaction mixture. The polymerization may be conducted using a range of process variations. For example, all the reactants (anhydride, initiator, amine compound) may be combined in the aromatic hydrocarbon solvent and heated to the desired polymerization temperature and held at polymerization conditions until high monomer conversion has been achieved; however, this type of polymerization would require extensive heat removal capability to accommodate the polymerization exotherm.

Preferably, the anhydride monomer is dissolved in the aromatic hydrocarbon by heating and the initiator and amine compound (optionally in aromatic hydrocarbon or in an inert solvent) are then added at polymerization temperature over a period of time (continuously or intermittently); preferably the amine compound is added to the anhydride solution prior to addition of the freeradical initiator. Alternatively, some or all of the anhydride monomer (in aromatic hydrocarbon) may be added to the polymerization reactor at the same time that the initiator is being added to the polymerization reactor. In another embodiment of the invention, additional initiator, after a major portion of the anhydride monomer has been polymerized (first stage), for example greater than 75% and preferably greater than about 85% anhydride conversion, may be added to the polymerization reactor to complete the polymerization (second stage or post-polymerization), that is, greater than about 95% and more preferably greater than 99% anhydride conversion; the additional initiator may be used alone in the second stage or additional amine compound may be added in conjunction with the additional initiator. Preferably 50 to 100%, more preferably 50 to 75% and most preferably 50 to 60%, of the total initiator is used in the first stage with the remainder being used in the second stage. Preferably 75 to 100%, and more preferably 90 to 100%, of the total amine is used in the first stage with any remainder being used in the second stage.

The polymerization is typically conducted using an inert gas atmosphere, for example nitrogen. The polymerization is preferably conducted near or at the boiling point of the aromatic solvents used, that is, under reflux conditions. Generally, the temperature of the polymerization may be up to the boiling point of the aromatic solvents used, for example, from 80 to 180° C., preferably from 110 to 165° C., more preferably from 120 to 150° C. and most preferably from 130 to 145° C., although the polymerization can be conducted under pressure if higher temperatures are used. The polymerization (including monomer and initiator feeds and hold times) is run generally for about 2 to 10 hours, preferably from 3 to 6 hours, or until the desired monomer conversion has been reached, for example, until at least 90%, preferably at least 95%, more preferably at least 97% and most preferably at least 99%, of the anhydride monomer has been converted to polymer. As is recognized by those skilled in the art, the time and temperature of the reaction are dependent on the choice of initiator and target molecular weight and can be varied accordingly.

The poly(anhydride) product may be isolated as the poly(anhydride) or it may be hydrolyzed to the corresponding acid or salt forms. When the poly(carboxylic acid) form is the desired product, water can be added to a solution of the poly(anhydride) in aromatic hydrocarbon or a major portion of the aromatic hydrocarbon can be removed from the poly(anhydride) by distillation first, followed by the addition of water. The remaining aromatic hydrocarbon can then be removed by steam distillation or azeotropic distillation during completion of the hydrolysis step. The resulting aqueous solution of the hydrolyzed poly(anhydride) may then be neutralized with alkali, ammonia or amines to provide the corresponding salt form of the poly(carboxylic acid). Alternatively, the neutralizing agent may be added before removal of the aromatic hydrocarbon solvent, followed by phase separation or by distillation of the aromatic hydrocarbon during completion of the hydrolysis and neutralization. Useful neutralizing agents include, for example, sodium hydroxide, potassium hydroxide, ammonium hydroxide, triethanolamine, dimethylaminoethanol, ethanolamine and trimethylhydroxyethylammonium hydroxide. Preferred neutralizing agents are sodium hydroxide and potassium hydroxide.

The control of molecular weight of the resultant poly (carboxylic acid) product is achieved by the level of initiator used and the action of chain transfer characteristics of the aromatic hydrocarbon solvents. The process of the present invention is useful in providing low molecular weight water-soluble polymers containing carboxylic acid moieties. Low molecular weight refers to a weight average molecular weight ($M_w$) less than 5,000, preferably less than 2,000. The molecular weights referred to are those measured by aqueous gel permeation chromatography (GPC) relative to a poly(acrylic acid) standard having $M_w$ of 2,000.

Abbreviations used in the Examples and Tables are listed below with the corresponding descriptions.

DBP=Di-tert-butyl peroxide
LPO=Lauroyl peroxide
DAP=Di-tert-amyl peroxide
BDBV=n-Butyl-4,4-di-(tert-butylperoxy)valerate
NOA=n-Octylamine
EDA=Ethylenediamine
DETA=Diethylenetriamine
TMBA=1,1,3,3-Tetramethylbutylamine
EHAm=Ethylhexylamine
DBAm=Dibutylamine
MBAm=Methyldibutylamine
DMAn=Dimethylaniline Some embodiments of the invention are described in detail in the following Examples. All ratios, parts and percentages (%) are expressed by weight unless otherwise specified, and all reagents used are of good commercial quality unless otherwise specified. A summary of reaction parameters and amine types and concentrations used in the polymerization of maleic anhydride with di-tert-butyl peroxide is presented in Table 1.

EXAMPLE 1 (comparative)

To a 1-liter, 4-necked flask equipped with mechanical stirrer, a reflux condenser topped with nitrogen inlet, and a thermocouple, was added 200.00 grams (g) of maleic anhydride and 200.00 g technical grade xylenes. After inerting the reactor with nitrogen, the stirred solution was heated to reflux (140–145° C.), then 40.00 g di-tert-butyl peroxide (DBP) in 147.00 g xylenes was gradually added over 2 hours. The solution was then maintained at reflux for 2 hours. The reactor was then modified for vacuum distillation and xylene was distilled off (227.7 g). The remaining reaction solution was cooled to below 100° C. and 100 g deionized water was added. The reaction solution was then heated to reflux (103–107° C.) and any remaining xylenes were removed by azeotropic distillation. The remaining reaction solution was then cooled again to below 100° C. and further diluted with 212.9 g deionized water. The final aqueous solution contained 8.5% residual maleic acid, corresponding to 79% conversion based on maleic anhydride.

EXAMPLE 2 (comparative)

To a 2.5-liter, Parr pressure reactor (rated at $3.5 \times 10^6$ Pascals (Pa) or 500 pounds per square inch (psi) at 400° C.) equipped with mechanical stirrer, nitrogen inlet, thermocouple and feed inlets, were added 200.40 g maleic anhydride and 200.20 g reagent grade xylenes. The stirred solution was inerted with nitrogen, put under mild vacuum ($3.4 \times 10^4$ Pa or 10 psi vacuum) and heated to 139–141° C., then 20.10 g DBP in 24.40 g xylenes was gradually added over 60 minutes. The solution was held at temperature for 2.5 hours (reactor pressure of $1.3 \times 10^5$ Pa or 4 psi) and then diluted with 180.55 g xylenes over 36 minutes. After the dilution, 14.00 g DBP in 27.60 g xylenes was added over 30 minutes at 139–141° C. and the solution was held at temperature for an additional 110 minutes (reactor pressure of $1.3 \times 10^5$ Pa or 5 psi) before being cooled to 95° C. To the stirred solution 200.0 g distilled water was slowly added. The solution was stirred for an additional 20 minutes, allowed to cool to 75° C. and the aqueous and organic phases were separated. The xylene phase was washed twice with 50.0 g distilled water and the combined aqueous phases were distilled under a nitrogen sweep to concentrate to a weight of 470.5 g aqueous reactor solution. The final aqueous solution contained 16% residual maleic acid, corresponding to 68% conversion based on maleic anhydride.

EXAMPLE 3

To a 1-liter, 4-necked flask equipped with mechanical stirrer, a reflux condenser topped with nitrogen inlet, and a thermocouple, was added 200.00 g maleic anhydride and 200.00 g technical grade xylenes. After inerting the reactor, the reactor contents were heated to 60° C. to dissolve the maleic anhydride and then 1.00 g n-octylamine (NOA) was added. The stirred reactor contents were then heated to reflux (140–145° C.) and 20.00 g DBP in 167.00 g xylenes was gradually added over 2 hours. The solution was then maintained at reflux for 2 hours. The reactor was then modified for vacuum distillation and xylene was distilled off (278.9 g). The remaining reaction solution was cooled to below 100° C. and 100 g deionized water was added. The reaction solution was then heated to reflux (103–107° C.) and 45 g remaining xylenes were removed by azeotropic distillation. The remaining reaction solution was then cooled again to below 100° C. and further diluted with 264.7 g deionized water. The final aqueous solution contained no detectable maleic acid (limit of detection of 0.1% by weight), corresponding to at least 99.8% conversion based on maleic anhydride.

EXAMPLE 4

To a 2.5-liter, Parr pressure reactor (rated at $3.5 \times 10^6$ Pa or 500 psi at 400° C.) equipped with mechanical stirrer, nitrogen inlet, thermocouple and feed inlets, were added 400.10 g maleic anhydride, 327.30 g reagent grade xylenes and 1.10 g NOA. The stirred solution was inerted with nitrogen, put under mild vacuum ($3.4 \times 10^4$ Pa or 10 psi vacuum) and heated to 140° C., then 40.30 g DBP in 48.00 g xylenes was gradually added over 60 minutes. The solution was held at 140–142° C. for 62 minutes (reactor pressure of $1.1 \times 10^5$ Pa or 2 psi) and then diluted over 35 minutes with 363.00 g xylenes. After the dilution, 28.20 g DBP in 45.00 g xylenes was added over 30 minutes at 140–142° C. and the solution was held at temperature (reactor pressure of $1.6 \times 10^5$ Pa or 8 psi) for an additional 60 minutes before being cooled to 95° C. To the stirred solution 396.00 g distilled water was slowly added. The solution was stirred for an additional 15 minutes, allowed to cool to 75° C. and the aqueous and organic phases were separated. The xylene phase was washed twice with 100.0 g distilled water and the combined aqueous phases were distilled under a nitrogen sweep to concentrate to a weight of 979.00 g aqueous reactor solution. The final aqueous solution contained no detectable maleic acid (limit of detection of 0.1% by weight), corresponding to at least 99.8% conversion based on maleic anhydride.

EXAMPLE 5–28

In a manner similar to that described in the Examples above, different levels and types of initiator and different levels and types of amine compounds were used to prepare poly(maleic acid). Examples 1 and 2 are representative of prior art single-stage and two-stage polymerization processes, respectively. Examples 3 and 4 represent single-stage and two-stage polymerization processes, respectively, of the present invention. Examples 5–11 represent single stage polymerization processes of the present invention that were conducted in a manner similar to that described in Example 3; Examples 12–23 represent two-stage polymerization processes of the present invention that were conducted in a manner similar to that described in Example 4 (except that Examples 13, 17, 18 and 20–23 were conducted in 1-liter or 2-liter multinecked reactors equipped with a reflux condenser).

Examples 2A–2C show the effect of temperature on the two-stage polymerization process of the prior art, that is, increasing the temperature alone, in the absence of amine compound, was not effective in producing high monomer conversion. Examples 5–11 show the beneficial effect of low levels of different amine compounds on monomer conversion for a single-stage polymerization; for example, Example 11 demonstrates that the free-radical initiator can be reduced by a factor of four in the presence of 0.25% n-octylamine and still provide an improvement in monomer conversion to over 90% (compare to Example 1 at 79% conversion). Examples 12–23 show the beneficial effect of low levels of different amine compounds on monomer conversion for a two-stage polymerization; for example, Examples 21–23 demonstrate that monomer conversions in excess of 95% can be achieved in the presence of 0.06–0.25% n-octylamine at lower temperatures when compared to Example 2 at 68% conversion.

TABLE 1

| Ex # | Init Conc | Init | Amine Conc[b] | Amine | Temp °C. | Conv[c] |
|---|---|---|---|---|---|---|
| 1 | 20 | DBP | 0 | — | refl[e] | 79 |
| 2 | 17[a] | DBP | 0 | — | 145[d] | 68 |
| 2A | 17[a] | DBP | 0 | — | 140 | 58 |
| 2B | 17[a] | DBP | 0 | — | 155[d] | 82 |
| 2C | 17[a] | DBP | 0 | — | 165[d] | 93 |
| 3 | 10 | DBP | 0.5 | NOA | refl[e] | 99.8+ |
| 4 | 17[a] | DBP | 0.25 | NOA | 140[d] | 99.8+ |
| 5 | 20 | DBP | 0.5 | DBAm | refl[e] | 99.8+ |
| 6 | 20 | DBP | 0.5 | MBAm | refl[e] | 99.8+ |
| 7 | 20 | DBP | 0.5 | DMAn | refl[e] | 99.8+ |
| 8 | 20 | DBP | 0.5 | NOA | refl[e] | 99.8+ |
| 9 | 20 | DBP | 0.25 | NOA | refl[e] | 99.8+ |
| 10 | 10 | DBP | 0.25 | NOA | refl[e] | 98.7 |
| 11 | 5 | DBP | 0.25 | NOA | refl[e] | 91 |
| 12 | 17[a] | DBP | 1 | NH$_3$ | 155[d] | 99.8+ |
| 13 | 17[a] | DBP | 1 | TMBA | 140 | 99.4 |
| 14 | 17[a] | DBP | 1 | TMBA | 145[d] | 99.8+ |
| 15 | 17[a] | DBP | 1 | TMBA | 155[d] | 99.8+ |
| 16 | 17[a] | DBP | 0.5 | EHAm | 140[d] | 99.6 |
| 17 | 15[a] | DBP | 0.25 | EDA | 140 | 99.8+ |
| 18 | 15[a] | DBP | 0.27 | DETA | 140 | 99.8+ |
| 19 | 17[a] | DBP | 0.5 | NOA | 140[d] | 99.6 |
| 20 | 15[a] | DBP | 0.25 | NOA | 140 | 99.8+ |
| 21 | 15[a] | DBP | 0.25 | NOA | 130 | 96.8 |
| 22 | 17[a] | DBP | 0.125 | NOA | 140 | 99.8+ |
| 23 | 17[a] | DBP | 0.06 | NOA | 140 | 96 |

[a] = weight percent initiator used, based on monomer, 10% in first stage of polymerization and remaining 5 or 7% in second stage of polymerization.
[b] = weight percent amine used, based on monomer.
[c] = monomer conversion, weight percent of monomer used; 99.8+ indicates residual maleic acid was below detectable analytical limits, less than 0.1% in solution.
[d] = pressurized or capped polymerization reactor.
[e] = run under reflux conditions, 140–145° C.

Table 2 presents a summary of maleic anhydride polymerizations involving free-radical initiators other than di-tert-butyl peroxide. Examples 24–26 represent polymerization processes using dialkyl peroxides and were conducted in a manner similar to that described in Example 3; Examples 24 and 26 show the effect of the dialkyl peroxide on maleic anhydride conversion in the absence of amine compound and Example 25 demonstrates that the dialkyl peroxide concentration may be reduced by 50% in the presence of 0.25% amine compound while maintaining high monomer conversion. Example 27 represents a prior art polymerization process using diacyl peroxide initiator (lauroyl peroxide) and Example 28 demonstrates that the presence of amine compound has no beneficial effect on the polymerization using the diacyl peroxide in contrast to the beneficial effect of amine compound on the dialkyl peroxide polymerizations of anhydrides (as shown in Examples 1–25).

TABLE 2

| Ex # | Init Conc | Init | Amine Conc[a] | Amine | Temp °C. | Conv[b] |
|---|---|---|---|---|---|---|
| 24 | 24 | DAP | 0 | — | refl[c] | 99.8+ |
| 25 | 12 | DAP | 0.25 | NOA | refl[c] | 99.8+ |
| 26 | 20 | BDBV | 0 | — | refl[c] | 77 |
| 27 | 20 | LPO | 0 | — | refl[c] | 96 |
| 28 | 20 | LPO | 0.25 | NOA | refl[c] | 94.5 |

[a] = weight percent amine used, based on monomer.
[b] = monomer conversion, weight percent of monomer used; 99.8+ indicates residual maleic acid was below detectable analytical limits; less than 0.1% in solution.
[c] = run under reflux conditions, 140–145° C.

We claim:

1. A polymerization process for preparing anhydride polymers, comprising polymerizing monomer selected from one or more of maleic anhydride, citraconic anhydride, itaconic anhydride, 1,2,3,6-tetrahydrophthalic anhydride, 5-norbornene-2,3-dicarboxylic anhydride, bicyclo[2.2.2]-5-octene-2,3-dicarboxylic anhydride, 3-methyl-1,2,6-tetrahydrophthalic anhydride and 2-methyl-1,3,6-tetrahydrophthalic anhydride, in the presence of (a) an aromatic hydrocarbon,
(b) 3 to 30 percent by weight, based on weight of monomer, of dialkyl peroxide, and
(c) 0.01 to 3 percent by weight, based on weight of monomer, of an amine compound selected from one or more of ammonia, ($C_1$–$C_{22}$)aliphatic amine and ($C_6$–$C_{20}$)aromatic amine;

until greater than 90 percent by weight of the anhydride monomer has been converted to polymer.

2. The process according to claim 1 wherein the polymerization is conducted at a temperature from 80 to 180° C.

3. The process according to claim 1 wherein the monomer comprises at least 90 percent maleic anhydride by weight based on total weight of monomer.

4. The process according to claim 1 wherein the aromatic hydrocarbon is selected from one or more of toluene, ($C_8$)aromatic hydrocarbon, ($C_9$)aromatic hydrocarbon and ($C_{10}$)aromatic hydrocarbon.

5. The process according to claim 4 wherein the ($C_8$) aromatic hydrocarbon is selected from one or more of ethylbenzene, ortho-xylene, meta-xylene and paraxylene.

6. The process according to claim 1 wherein the amine compound is selected from one or more of dibutylamine, ethylhexylamine, methydibutyl-amine, ethylenediamine, diethylenetriamine, n-octylamine, 1,1,3,3-tetramethylbutylamine and dimethylaniline.

7. The process according to claim 1 wherein the dialkyl peroxide is used in an amount from 10 to 20 percent by weight based on weight of monomer.

8. The process according to claim 1 wherein the amine compound is used in an amount from 0.1 to 1 percent by weight based on weight of monomer.

9. The process according to claim 1 wherein the anhydride polymer has a weight-average molecular weight of less than 2,000.

10. The process according to claim 1 wherein the anhydride is present in a concentration of from 25 to 70 percent by weight, based on total weight of reaction mixture.

11. The process according to claim 10 wherein the concentration is from 30 to 60 percent by weight.

12. The process according to claim 1 wherein optional monomer polymerized in combination with anhydride monomers is less than 20 percent by weight, based on total weight of monomer.

13. The process according to claim 12 wherein the optional monomer polymerized is less than 5 percent by weight.

14. The process according to claim 1 wherein greater than 95 percent by weight of the anhydride monomer has been converted to polymer.

15. The process according to claim 1 wherein the amine compound and the dialkyl peroxide are in a weight ratio of 0.001/1 to 0.5/1 with respect to each other.

16. The process according to claim 1 wherein the dialkyl peroxide is selected from one or more of di-tert-butyl peroxide, di-tert-amyl peroxide, n-butyl-4,4-di(tert-butylperoxy)pivalate, tert-butyl cumyl peroxide and dicumyl peroxide.

* * * * *